No. 735,257. PATENTED AUG. 4, 1903.
J. P. HODGINS.
SCRAPER.
APPLICATION FILED APR. 9, 1903.
NO MODEL.
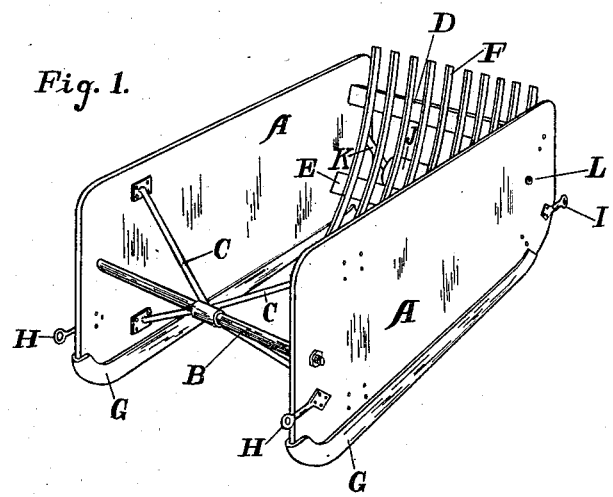
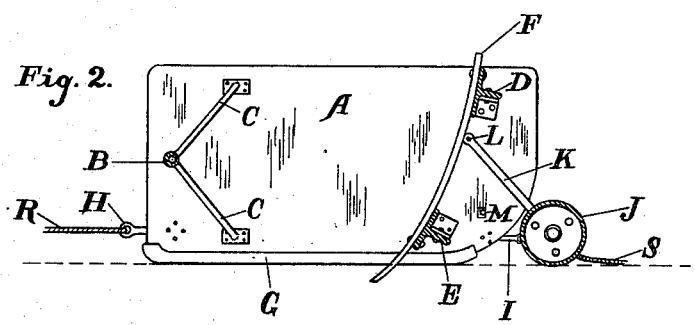
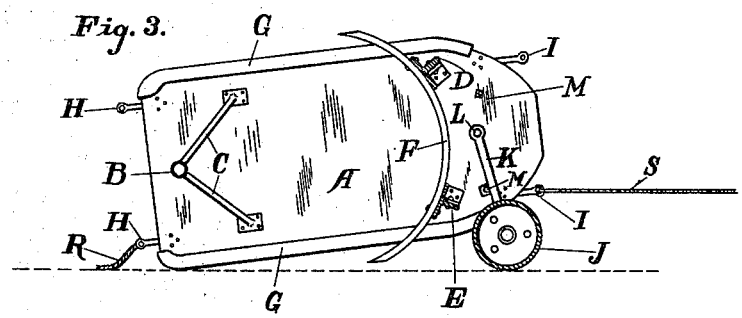
Witnesses
Fred J Shaw
P. H. Walbridge
Joseph P. Hodgins.
Inventor
By P. J. Elliott
His Attorney
THE NORRIS PETERS CO., PHOTO-LITHO., WASHINGTON, D. C.

No. 735,257. Patented August 4, 1903.

UNITED STATES PATENT OFFICE.

JOSEPH P. HODGINS, OF TACOMA, WASHINGTON.

SCRAPER.

SPECIFICATION forming part of Letters Patent No. 735,257, dated August 4, 1903.

Application filed April 9, 1903. Serial No. 151,811. (No model.)

*To all whom it may concern:*

Be it known that I, JOSEPH P. HODGINS, a citizen of the United States, and a resident of Tacoma, in the county of Pierce and State of Washington, have invented a new and useful Improvement in Scrapers, of which the following is a specification.

My invention relates to scrapers for grading, and especially that class of grading in which there is considerable loose rock, though one form of my invention is equally useful for dirt.

My invention belongs to that class of scrapers which are operated from a distance by means of cables, and has among its objects the handling of loose rock, the protection of the teeth or tines on the scraper when on its return from dumping, and to facilitate the dumping of the rock, dirt, &c., from the scraper when it starts on its return. I attain these objects by the devices illustrated in the accompanying drawings, in which—

Figure 1 is a perspective view of my scraper. Fig. 2 is a vertical longitudinal section thereof. Fig. 3 is a similar section of a modified form, showing the scraper in the position assumed when dumping and on its return run.

Similar letters of reference refer to similar parts throughout the several views.

In grading by means of a donkey-engine and cable, or, in fact, by any means, there has been great difficulty in handling loose rock. I have found that by the use of a curved grating closing the rear of the scraper and by having the tines of the grating project down below the bottom of the sides of the scraper I am able to handle with ease loose rock and earth. The modified form is especially designed for use with earth. In order to facilitate the dumping and to reduce the wear of the tines, I have arranged that the rear end carrying the grating be elevated from its normal position when the return-rope is pulled, causing the scraper to tip somewhat and to dump the load and at the same time lifting the tines clear of the ground. The scraper retains this tipped position throughout the length of the return run.

The plates A form the sides of my scraper and are joined in front by the rod B, securely fastened to each plate. This rod B may be strengthened by braces C, as shown in the drawings, extending from the center of the rod B to the sides A. The rear ends of these plates A are joined by the T-bars D and E near their upper and lower edges, respectively, these T-bars being secured to the plates A by angle-irons or other suitable means.

Secured to the bars D and E and placed so as to incline toward the rear from the bottom upward are the grating-tines F. These tines are curved, their concave sides being toward the front and have their lower ends extending downward below the bottom of the sides A. I prefer to secure these tines F to the bars D and E by means of bolts or other similar fastenings, whereby if one of them becomes broken or badly bent it can be removed and replaced by another without undue delay.

The top and bottom of my scraper are open, though I sometimes place a hood over the top of the hereinafter-described modified form in order to keep the dirt from passing over the grating.

On the lower edges of the plates A are secured the shoes G, which I make of hard cast-iron. These shoes will prevent the sides A from wearing and will protect them to a large degree from bending or other injury incident to the rough handling they will receive in performing the work of grading loose rock.

The cable R for hauling the scraper forward is secured to the lugs H, and the cable S for hauling it backward is secured to the lugs I. These lugs H and I, I prefer to place near the lower edges of the sides A, as I find that the scraper works better with them in that position than if they were placed higher up.

Between the plates A and to the rear of the grating F, I hang the roller J by means of arms K, swinging on the pivots L, which secure the arms K to the sides A. This roller J follows the scraper when it is going forward, rolling loosely on the ground and having no effect on the scraper. When the return-cable S is pulled, the roller swings the arms K and tends to pass under the scraper, and thus lifts the rear end of the scraper up, thus assisting in the dumping of the rock, &c., and bringing the ends of the grating-tines F clear of the ground. In passing to this position the arms K swing on the pivots L until they come in contact with the stops M, secured to the sides A, which prevent the roller J from swinging so far back as to come in contact with the grating-tines F.

The modified construction shown in Fig. 3 is especially designed for common dirt-grading. The tines F are curved symmetrically with respect to the horizontal center line of the scraper. Both ends of the tines are shaped for grading, so that either may be used by simply turning the scraper over. I find that this shape of tine is the best when working with dirt, because the dirt has a tendency to pass over the top of the scraper-tines if they are shaped as in Figs. 1 and 2. It is sometimes necessary to supplement the tines with a cover or hood to keep the dirt from passing over the back and sides. I prefer to place the cast-iron shoes G on both edges of the plates A in this form of scraper. The arms K are pivoted on the center line of the plates by pivots L, so that the roller will work whichever side of the scraper may be in use. The stops M and the lugs H and I are duplicated in this form in positions symmetrical about the center line.

What I claim, and desire to secure by Letters Patent, is—

1. A scraper consisting of vertical closed sides and a rear end grating.

2. A scraper consisting of vertical closed sides and a series of curved tines projecting below the lower surface of the sides and forming a grating across the rear end of said scraper.

3. A scraper consisting of vertical closed sides and a series of inclined curved tines projecting below the lower surface of the sides and forming a grating across the rear end of said scraper.

4. In a scraper the combination of vertical closed sides, a series of inclined curved tines forming a grating across the rear end of said scraper, arms pivoted to said sides, and a roller journaled to said arms whereby the rear of said scraper is elevated when dumping or returning.

5. In a scraper the combination of vertical closed sides, a series of inclined curved tines forming a grating across the rear end of said scraper, arms pivoted to said sides, a roller journaled to said arms, and stops secured to said sides limiting the motion of said arms.

In testimony whereof I have signed my name to this specification in the presence of two subscribing witnesses.

JOSEPH P. HODGINS.

Witnesses:
E. C. ELLINGTON,
ELLIS LEWIS GARRETSON.